United States Patent
Lehman et al.

(10) Patent No.: US 10,259,356 B2
(45) Date of Patent: Apr. 16, 2019

(54) CHILD SAFETY SEAT

(71) Applicant: Wonderland Switzerland AG, Steinhausen (CH)

(72) Inventors: David Andrew Lehman, Lancaster, PA (US); Kyle S. Mason, West Lawn, PA (US); R Scott Anderson, Narvon, PA (US)

(73) Assignee: Wonderland Switzerland AG, Steinhausen (CH)

( * ) Notice: Subject to any disclaimer, the term of this patent is extended or adjusted under 35 U.S.C. 154(b) by 42 days.

(21) Appl. No.: 15/648,448

(22) Filed: Jul. 12, 2017

(65) Prior Publication Data

US 2018/0015855 A1    Jan. 18, 2018

Related U.S. Application Data

(60) Provisional application No. 62/461,992, filed on Feb. 22, 2017, provisional application No. 62/362,217, filed on Jul. 14, 2016.

(51) Int. Cl.
*B60N 2/28* (2006.01)
*B60N 2/75* (2018.01)

(52) U.S. Cl.
CPC ............... *B60N 2/28* (2013.01); *B60N 2/787* (2018.02); *B60N 2/79* (2018.02)

(58) Field of Classification Search
CPC ............. B60N 2/28; B60N 2/787; B60N 2/79
USPC ...................................................... 297/250.1
See application file for complete search history.

(56) References Cited

U.S. PATENT DOCUMENTS

| | | | |
|---|---|---|---|
| 5,186,520 A | 2/1993 | Whitaker | |
| 5,432,985 A | 7/1995 | Bernart | |
| 6,152,528 A | 11/2000 | van Montfort | |
| 6,474,735 B1 * | 11/2002 | Carnahan | B60N 2/2803 297/250.1 |
| 6,508,510 B2 | 1/2003 | Yamazaki | |
| 6,672,664 B2 | 1/2004 | Yanaka | |
| 6,676,212 B1 | 1/2004 | Amirault | |
| 6,857,700 B2 * | 2/2005 | Eastman | B60N 2/2806 297/250.1 |
| 6,916,066 B2 | 7/2005 | Sedlack | |
| 7,163,265 B2 | 1/2007 | Adachi | |
| 7,472,955 B2 | 1/2009 | Crane | |
| 7,926,874 B2 | 4/2011 | Hendry | |

(Continued)

FOREIGN PATENT DOCUMENTS

| | | |
|---|---|---|
| AU | 527654 | 3/1983 |
| CN | 1346616 A | 5/2002 |

(Continued)

*Primary Examiner* — Mark R Wendell
(74) *Attorney, Agent, or Firm* — Winston Hsu

(57) ABSTRACT

A child safety seat includes a seat body, an armrest, and an actuating mechanism. The seat body includes a seat base. The armrest has a first engaging portion. The actuating mechanism is disposed on the seat body. The actuating mechanism has an actuating portion and a second engaging portion. The actuating portion is exposed from the seat body. The second engaging portion is engaged with the first engaging portion when the armrest is disposed on the seat base. The second engaging portion is disengaged from the first engaging portion when the actuating portion is actuated to move the actuating mechanism, such that the armrest is able to be detached from the seat base.

14 Claims, 13 Drawing Sheets

(56) References Cited

U.S. PATENT DOCUMENTS

| | | |
|---|---|---|
| 7,988,230 B2 | 8/2011 | Heisey |
| 8,177,303 B2 | 5/2012 | Chen |
| 8,262,161 B2 | 9/2012 | Fritz |
| 8,308,231 B2 * | 11/2012 | Haut .................... B60N 2/2866 297/188.19 |
| 8,322,788 B2 | 12/2012 | Williams |
| 8,567,862 B2 | 10/2013 | Williams |
| 8,573,695 B2 | 11/2013 | Van Geer |
| 8,845,022 B2 | 9/2014 | Strong |
| 8,870,285 B2 | 10/2014 | Williams |
| 8,973,991 B2 | 3/2015 | Wuerstl |
| 8,973,992 B2 | 3/2015 | Guo |
| 9,156,379 B2 | 10/2015 | Williams |
| 9,174,554 B2 | 11/2015 | Maciejczyk |
| 9,308,838 B2 | 4/2016 | Miller |
| 9,315,124 B2 | 4/2016 | Lehman |
| 9,365,135 B2 | 6/2016 | Carpenter |
| 9,499,074 B2 | 11/2016 | Strong |
| 9,937,823 B2 | 4/2018 | Williams |
| 9,963,051 B2 | 5/2018 | Strong |
| 10,023,079 B2 | 7/2018 | Zhao |
| 10,035,436 B2 | 7/2018 | Zhou |
| 2002/0113470 A1 | 8/2002 | Kain |
| 2003/0151286 A1 | 8/2003 | Kain |
| 2003/0164632 A1 | 9/2003 | Sedlack |
| 2004/0070244 A1 * | 4/2004 | Williams ............. B60N 2/2851 297/250.1 |
| 2005/0110318 A1 | 5/2005 | Meeker |
| 2009/0127902 A1 | 5/2009 | Meeker |
| 2011/0057489 A1 | 3/2011 | Greene |
| 2014/0265489 A1 | 9/2014 | Morgenstern |
| 2016/0311345 A1 | 10/2016 | Morgenstern |
| 2016/0347210 A1 | 12/2016 | Mason |
| 2016/0347212 A1 | 12/2016 | Mason |
| 2017/0355287 A1 | 12/2017 | Anderson |
| 2018/0056822 A1 | 3/2018 | Anderson |

FOREIGN PATENT DOCUMENTS

| | | |
|---|---|---|
| CN | 101508255 A | 8/2009 |
| CN | 203254992 U | 10/2013 |
| DE | 25 22 285 A1 | 12/1975 |
| DE | 42 04 232 A1 | 9/1992 |
| DE | 10 2005 025 570 A1 | 12/2006 |
| DE | 10 2009 017 601 A1 | 10/2010 |
| DE | 10 2016 109 691 A1 | 12/2016 |
| EP | 1 393 967 A1 | 3/2004 |
| FR | 2 928 882 A1 | 9/2009 |
| GB | 2 282 321 A | 4/1995 |

* cited by examiner

CHILD SAFETY SEAT

CROSS REFERENCE TO RELATED APPLICATIONS

This application claims the benefit of U.S. Provisional Application No. 62/362,217, which was filed on Jul. 14, 2016, and is incorporated herein by reference and U.S. Provisional Application No. 62/461,992, which was filed on Feb. 22, 2017, and is incorporated herein by reference.

BACKGROUND OF THE INVENTION

1. Field of the Invention

The invention relates to a child safety seat and, more particularly, to a child safety seat equipped with a detachable armrest.

2. Description of the Prior Art

Child safety seats for children are available in a great many configurations depending upon the age, weight, and size of the child being transported. Parents can choose a car seat that is not only the correct size, but also suits their tastes, budget, and life style. One problem with some child safety seats is that they tend to be bulky since they include armrests disposed on opposite sides of a seat base. Furthermore, the armrests inhibit ingress and regress of a larger child as he/she tries to climb in and out of the child safety seat. The armrests also make it difficult to buckle a vehicle seat belt to install the child safety seat into a vehicle as a user must reach around the armrests.

SUMMARY OF THE INVENTION

The invention provides a child safety seat equipped with a detachable armrest, so as to solve the aforesaid problems.

According to an embodiment of the invention, a child safety seat comprises a seat body, an armrest, and an actuating mechanism. The seat body includes a seat base. The armrest has a first engaging portion. The actuating mechanism is disposed on the seat body. The actuating mechanism has an actuating portion and a second engaging portion. The actuating portion is exposed from the seat body. The second engaging portion is engaged with the first engaging portion when the armrest is disposed on the seat base. The second engaging portion is disengaged from the first engaging portion when the actuating portion is actuated to move the actuating mechanism, such that the armrest is able to be detached from the seat base.

According to another embodiment of the invention, a child safety seat comprises a seat base and an armrest. The seat base has a first engaging portion. The armrest has a second engaging portion. One of the first engaging portion and the second engaging portion is a recessed member. Another one of the first engaging portion and the second engaging portion is a protruded member. The second engaging portion is engaged with the first engaging portion in a sliding direction substantially parallel to a seat surface of the seat base, such that the armrest is detachably disposed on the seat base by a sliding manner.

As mentioned in the above, the armrest can be attached to the seat base as a child is seated on the seat base, such that the child can rest his/her hands on the armrest. Furthermore, the armrest can be detached from the seat base to reduce the size of the child safety seat. Accordingly, without the armrest, the child safety seat can be stored or transported easily, a child can climb in and out of the child safety seat easily, and a vehicle seat belt can be buckled to install the child safety seat into a vehicle easily.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
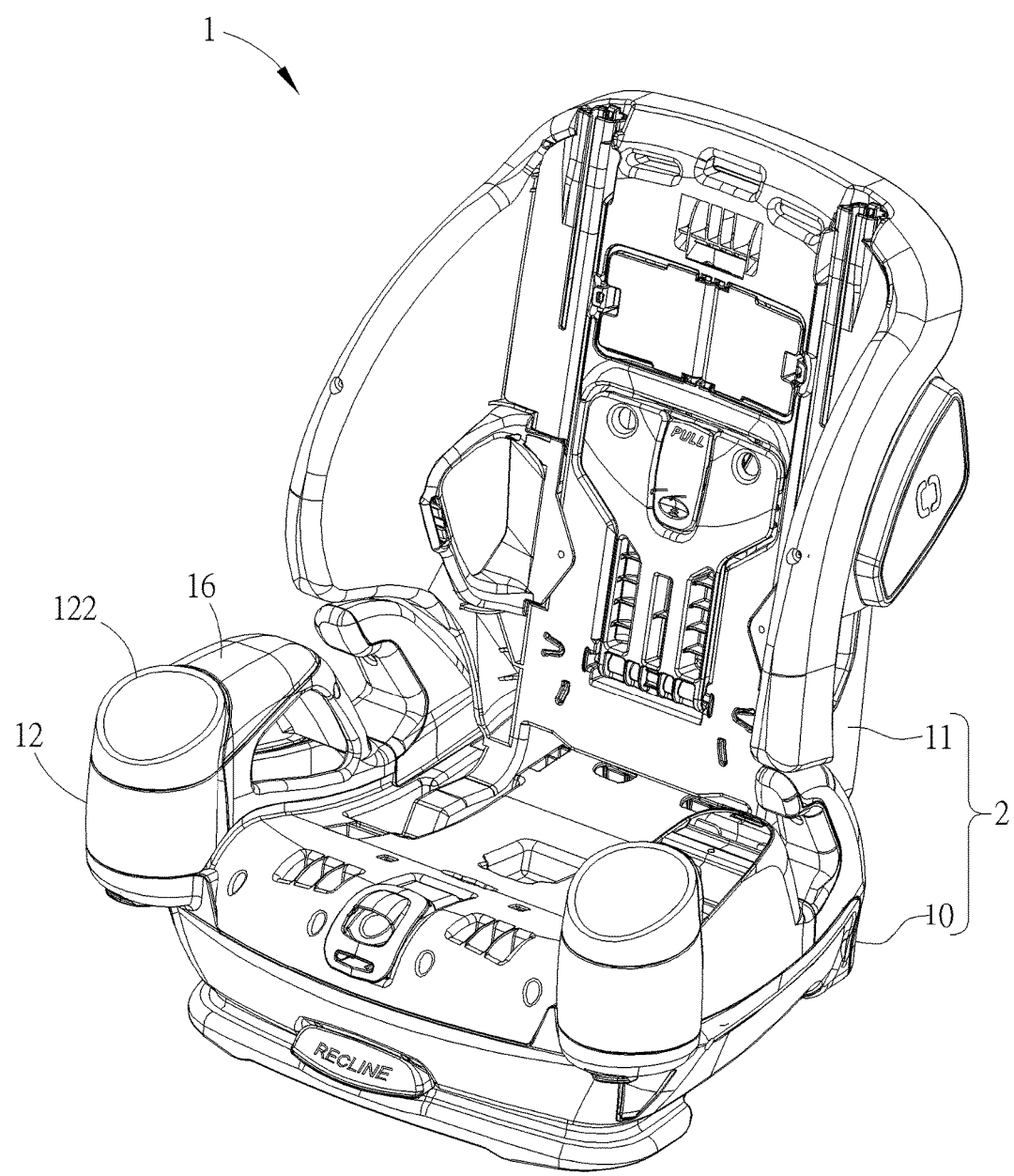
FIG. 1 is a perspective view illustrating a child safety seat according to an embodiment of the invention.
Figure 2:
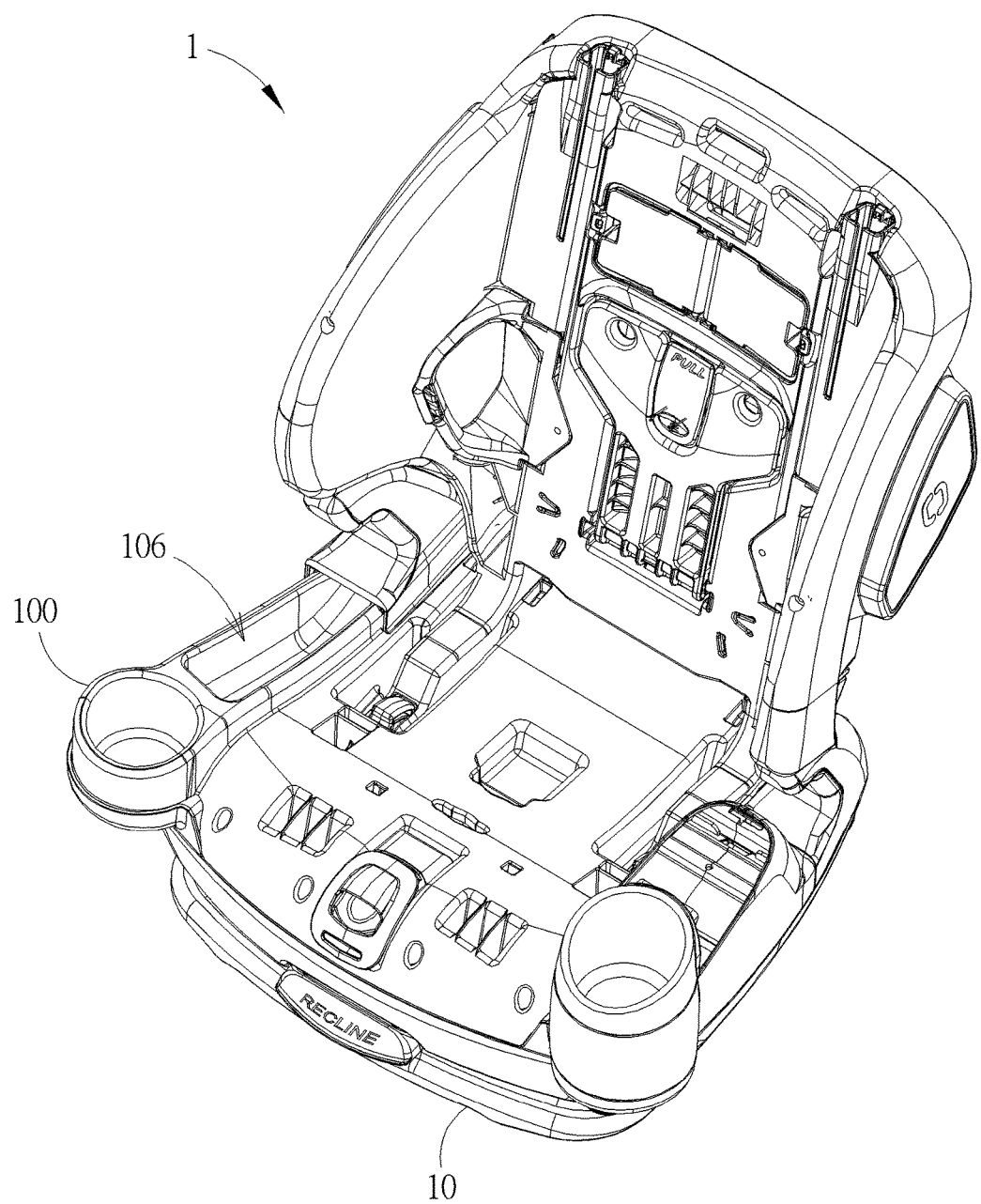
FIG. 2 is a perspective view illustrating the child safety seat without the armrest shown in FIG. 1.
Figure 3:
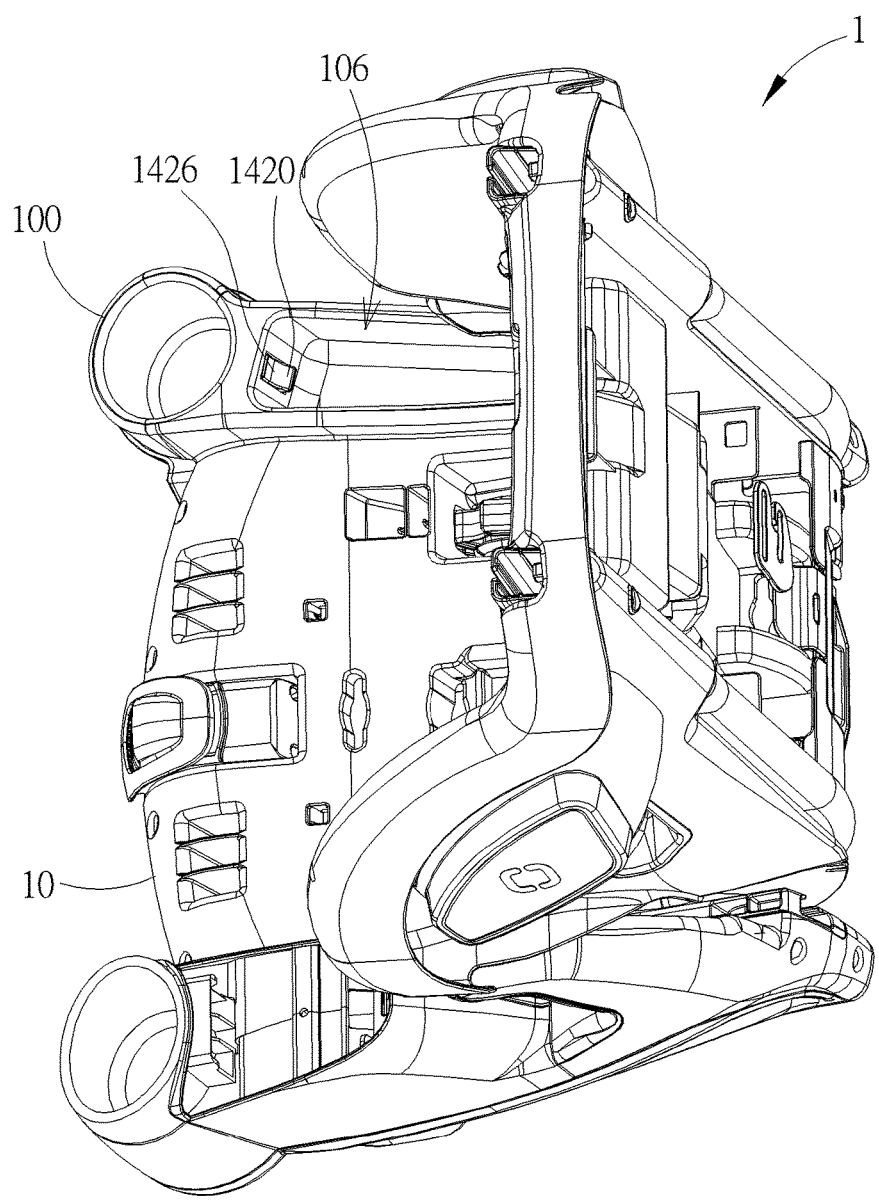
FIG. 3 is a perspective view illustrating the child safety seat shown in FIG. 2 from another viewing angle.
Figure 4:
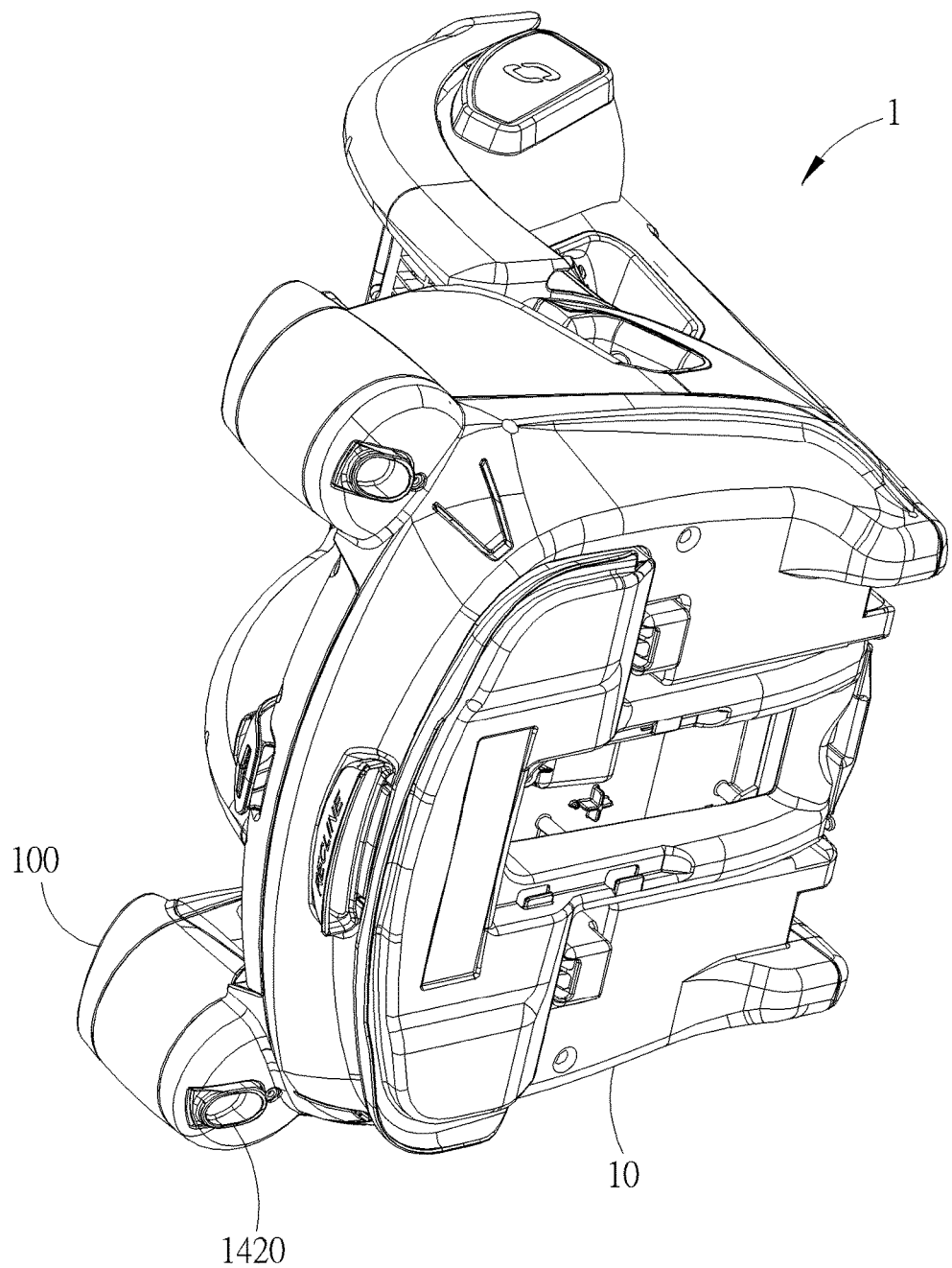
FIG. 4 is a perspective view illustrating the child safety seat shown in FIG. 2 from another viewing angle.
Figure 5:
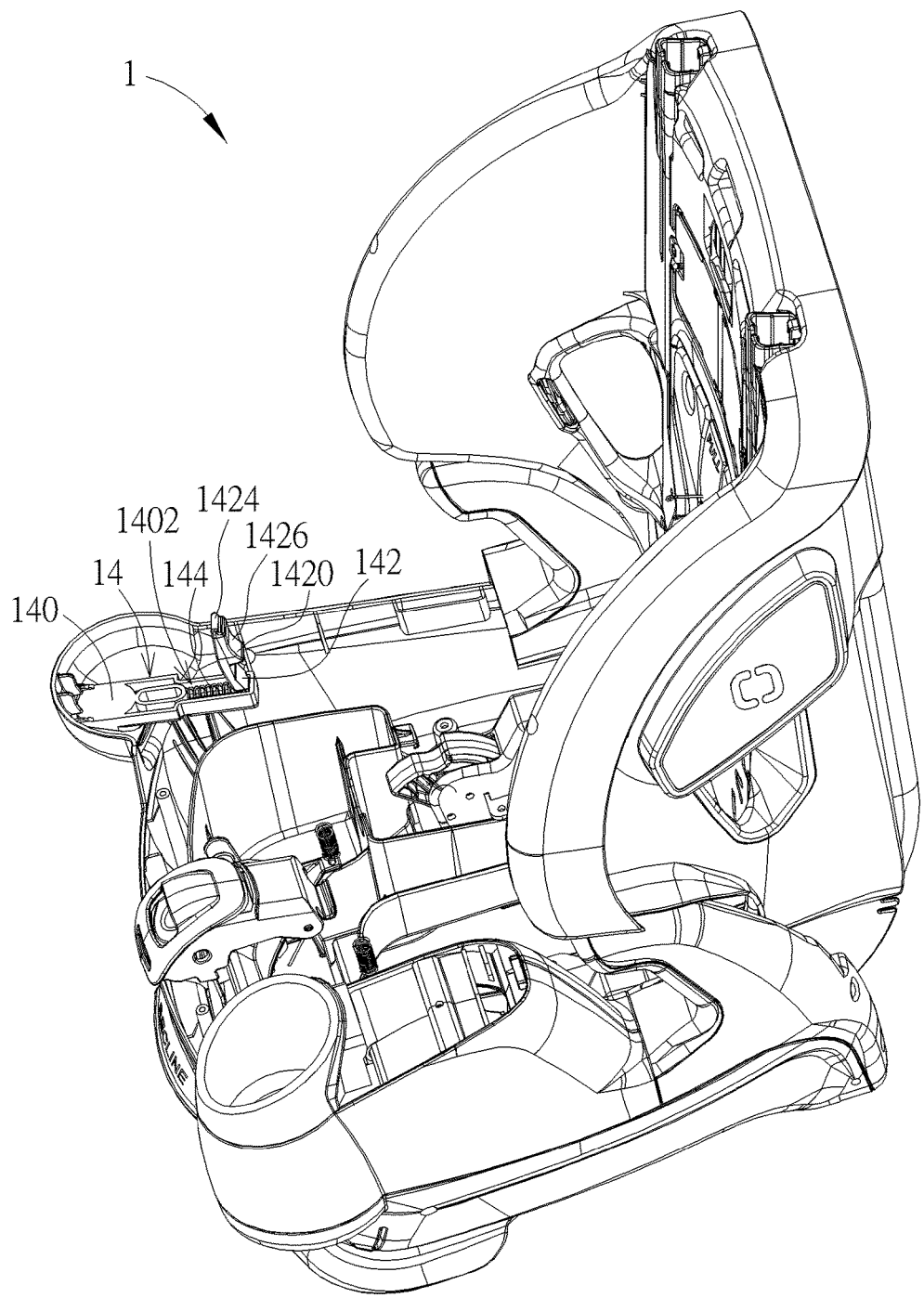
FIG. 5 is a perspective view illustrating the actuating mechanism disposed on the seat base.
Figure 6:
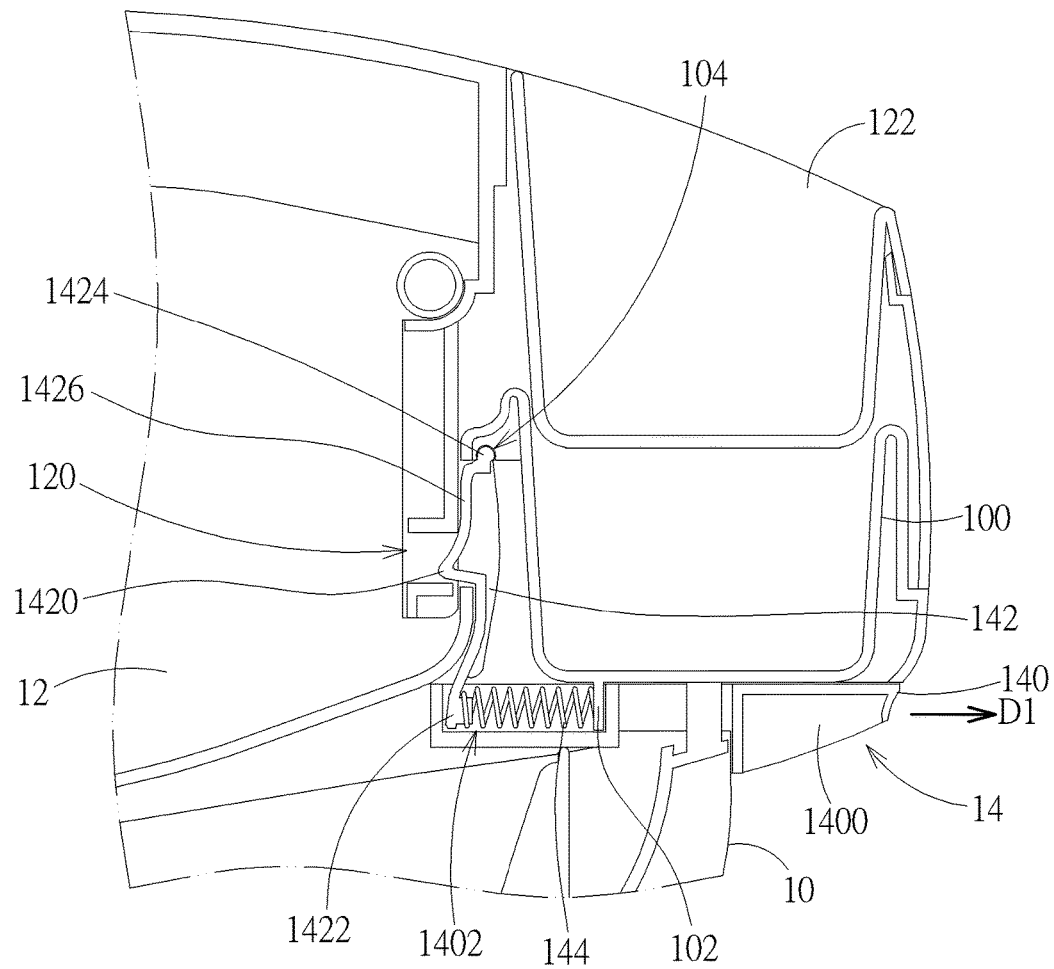
FIG. 6 is a sectional view illustrating the actuating mechanism engaged with the armrest.
Figure 7:
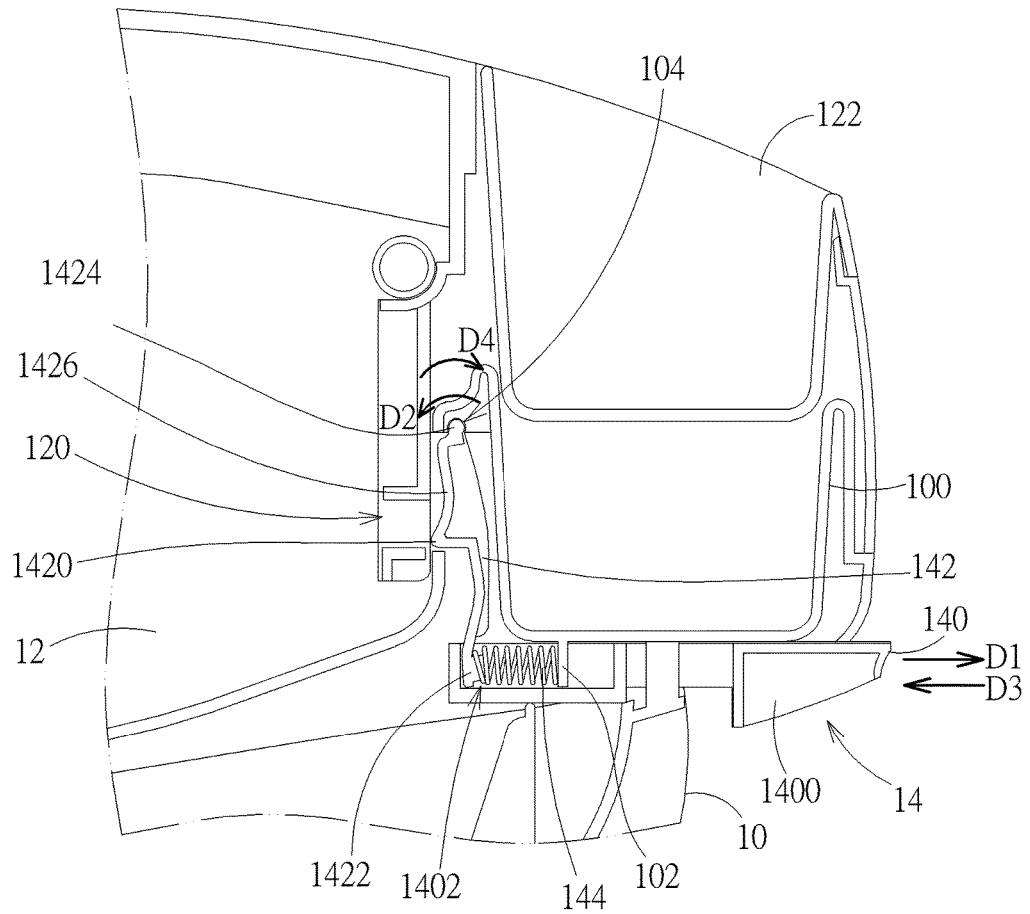
FIG. 7 is a sectional view illustrating the actuating mechanism disengaged from the armrest.

Referring to FIGS. 1 to 7, FIG. 1 is a perspective view illustrating a child safety seat 1 according to an embodiment of the invention, FIG. 2 is a perspective view illustrating the child safety seat 1 without the armrest 12 shown in FIG. 1, FIG. 3 is a perspective view illustrating the child safety seat 1 shown in FIG. 2 from another viewing angle, FIG. 4 is a perspective view illustrating the child safety seat 1 shown in FIG. 2 from another viewing angle, FIG. 5 is a perspective view illustrating the actuating mechanism 14 disposed on the seat base 10, FIG. 6 is a sectional view illustrating the actuating mechanism 14 engaged with the armrest 12, and FIG. 7 is a sectional view illustrating the actuating mechanism 14 disengaged from the armrest 12.

As shown in FIGS. 1 to 7, the child safety seat 1 comprises a seat body 2 including a seat base 10 and a seat back 11, an armrest 12, and an actuating mechanism 14. The armrest 12 has a first engaging portion 120. The actuating mechanism 14 is disposed on the seat base 10. The actuating mechanism 14 has an actuating portion 1400 and a second engaging portion 1420. In this embodiment, the actuating mechanism 14 may comprises an actuating member 140 and an engaging member 142, wherein the actuating member 140 provides the actuating portion 1400 and the engaging member 142 provides the second engaging portion 1420. In this embodiment, the first engaging portion 120 is an engaging hole and the second engaging portion 1420 is an engaging protrusion. In another embodiment, the first engaging portion 120 may also be an engaging protrusion and the second engaging portion 1420 may also be an engaging hole. In other words, one of the first engaging portion 120 and the second engaging portion 1420 may be an engaging hole, and another one of the first engaging portion 120 and the second engaging portion 1420 may be an engaging protrusion according to practical applications.

In this embodiment, the actuating member 140 further has a recess 1402. The recess 1402 is located in the seat base 10 and the actuating portion 1400 is exposed from the seat base 10 when the actuating member 140 is disposed on the seat base 10. Furthermore, the seat base 10 has a first cup holder 100 and the actuating member 140 is located at the bottom of the first cup holder 100. Accordingly, the actuating portion 1400 of the actuating member 140 can be easily accessible by a user and not accessible by a child seated on the seat base 10. The actuating member 140 may be made of plastic and the actuating portion 1400 may be pulled by a single finger of the user.

It should be noted that, in another embodiment, the actuating mechanism 14 may be disposed on other portions of the seat body 2 (e.g. the seat back 11) and the actuating portion 1400 may be exposed from other portions of the seat body 2. Besides, the seat back 11 can be removed. Therefore the invention can also be practiced on no-back child safety seat.

The engaging member 142 is connected to the actuating member 140. In this embodiment, a first end 1422 of the engaging member 142 may be disposed in and connected to the recess 1402 of the actuating member 140. Furthermore, the actuating mechanism 14 further comprises a resilient member 144 connected to the engaging member 142 and the seat base 10, wherein the resilient member 144 may be, but not limited to, a spring. In this embodiment, the seat base 10 may have a protruding portion 102 protruding from a bottom of the first cup holder 100 and located in the recess 1402 of the actuating member 140. The resilient member 144 may be disposed in the recess 1402 of the actuating member 140 and connected to the first end 1422 of the engaging member 142 and the protruding portion 102 of the seat base 10.

In this embodiment, the seat base 10 may have an engaging recess 104 inside and a second end 1424 of the engaging member 142 is rotatably engaged with the engaging recess 104, such that the engaging member 142 can be actuated by the actuating member 140 to rotate upon the second end 1424 when the actuating portion 1400 is actuated to move the actuating member 140.

As shown in FIG. 6, the second engaging portion 1420 of the engaging member 142 is engaged with the first engaging portion 120 of the armrest 12 when the armrest 12 is disposed on the seat base 10, such that the armrest 12 is fixed on the seat base 10 and cannot be detached from the seat base 10. If the user wants to detach the armrest 12 from the seat base 10, the user may use a finger to pull the actuating portion 1400 in a direction D1, so as to actuate the actuating member 140 to move in the direction D1.

Then, as shown in FIG. 7, the second engaging portion 1420 of the engaging member 142 is disengaged from the first engaging portion 120 of the armrest 12 when the actuating portion 1400 is actuated to move the actuating member 140 of the actuating mechanism 14 in the direction D1, such that the armrest 12 is able to be detached from the seat base 10. For further illustration, the engaging member 142 is actuated to rotate in the direction D2 by the actuating member 140 when the actuating portion 1400 is actuated to move the actuating member 140 in the direction D1, such that the second engaging portion 1420 of the engaging member 142 is disengaged from the first engaging portion 120 of the armrest 12.

In the meanwhile, the resilient member 144 is compressed by the first end 1422 of the engaging member 142 and the protruding portion 102 of the seat base 10. The compressed resilient member 144 may generate an elastic force to push the first end 1422 of the engaging member 142 and the actuating member 140 in the direction D3 when the actuating portion 1400 is released, such that the engaging member 142 is actuated to rotate in the direction D4 and then goes back to the position shown in FIG. 6.

In this embodiment, the second engaging portion 1420 of the engaging member 142 may have a curved surface 1426. Accordingly, the armrest 12 may abut against and push the engaging member 142 to rotate in the direction D2 away from the first engaging portion 120 through the curved surface 1426 smoothly when the armrest 12 is attached to the seat base 10. Then, the engaging member 142 rotates in the direction D4 by the elastic force of the resilient member 144 when the first engaging portion 120 of the armrest 12 is aligned with the second engaging portion 1420 of the engaging member 142, such that the second engaging portion 1420 of the engaging member 142 is engaged with the first engaging portion 120 of the armrest 12.

In this embodiment, the armrest 12 may have a second cup holder 122 and the second cup holder 122 is stacked on the first cup holder 100 when the armrest 12 is disposed on the seat base 10.

In this embodiment, the seat base 10 may further have an accommodating recess 106. As shown in FIG. 3, the second engaging portion 1420 of the engaging member 142 may protrude into the accommodating recess 106 of the seat base 10. The accommodating recess 106 is exposed and allows a child to put his/her personal items when the armrest 12 is detached from the seat base 10. The accommodating recess 106 is covered by the armrest 12 when the armrest 12 is attached to the seat base 10.

Figure 8:
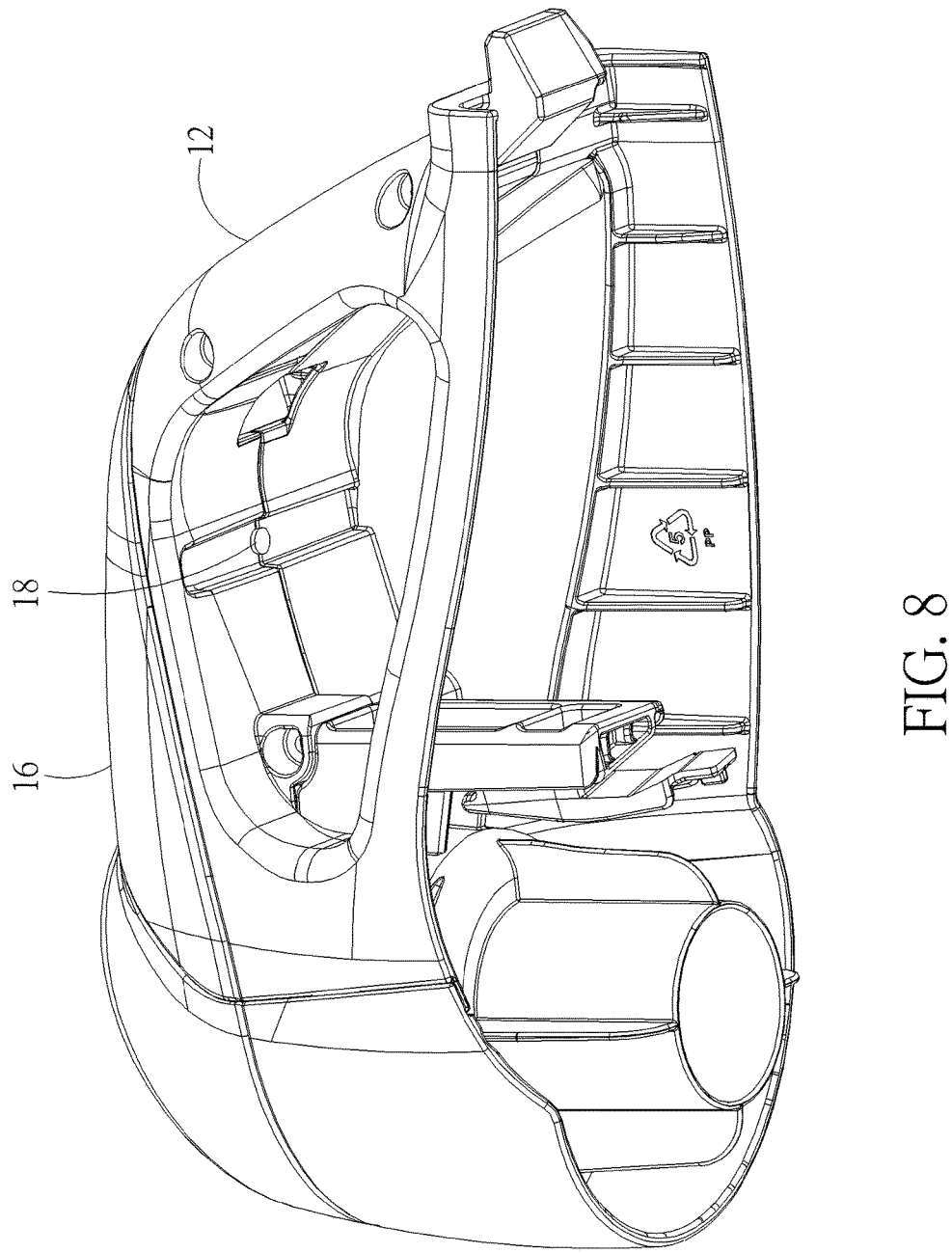
FIG. 8 is a perspective view illustrating the armrest and the cover shown in FIG. 1 from another viewing angle.

In this embodiment, the child safety seat 1 may further comprise a cover 16 detachably disposed on the armrest 12, as shown in FIG. 1. Referring to FIG. 8, FIG. 8 is a perspective view illustrating the armrest 12 and the cover 16 shown in FIG. 1 from another viewing angle. As shown in FIG. 8, the cover 16 may be assembled to the armrest 12 with a screw 18 from below to fit tightly to the armrest 12. In this embodiment, the cover 16 may be made of, but not limited to, thermoplastic elastomer (TPE), e.g. rubber, such that the cover 16 can be wiped clean easily.

Figure 9:
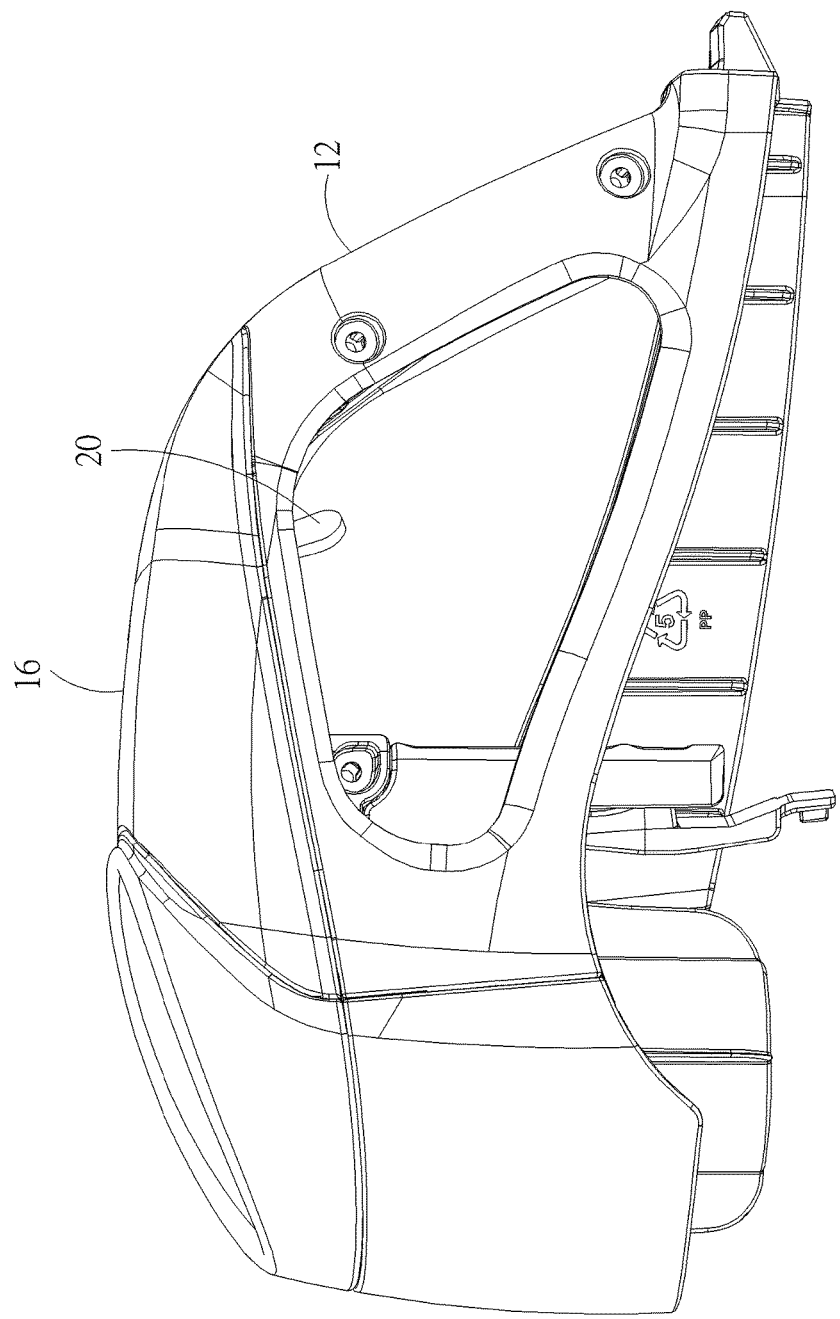
FIG. 9 is a side view illustrating the armrest and the cover according to another embodiment of the invention.

Referring to FIG. 9, FIG. 9 is a side view illustrating the armrest 12 and the cover 16 according to another embodiment of the invention. As shown in FIG. 9, the cover 16 may be assembled to the armrest 12 with a release tab 20 from below to fit tightly to the armrest 12. In this embodiment, the cover 16 may be covered by, but not limited to, soft goods, e.g. fabric. The cover 16 can be removed by the release tab 20 and allows the soft goods to be removed for washing.

Figure 10:
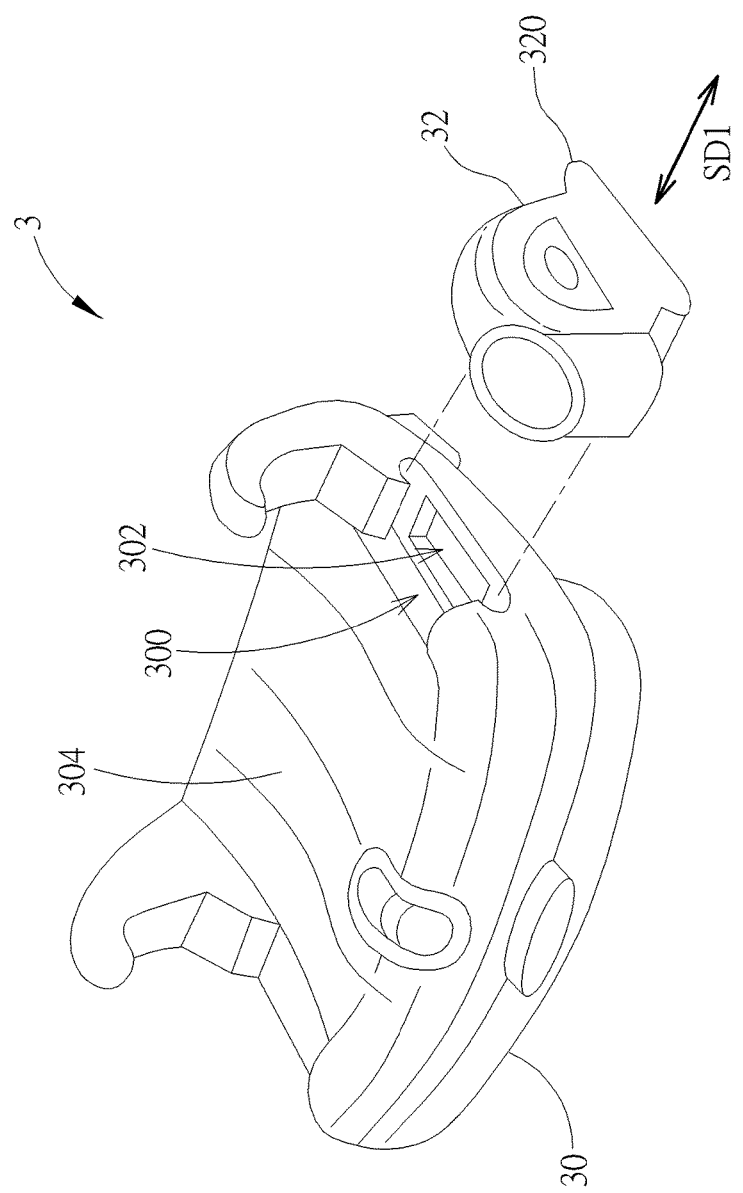
FIG. 10 is a perspective view illustrating a child safety seat according to another embodiment of the invention.

Referring to FIG. 10, FIG. 10 is a perspective view illustrating a child safety seat 3 according to another embodiment of the invention. As shown in FIG. 10, the child safety seat 3 comprises a seat base 30 and an armrest 32. The seat base 30 has a first engaging portion 300 and the armrest 32 has a second engaging portion 320. In this embodiment, the first engaging portion 300 is a recessed member, the second engaging portion 320 is a protruded member, and an accommodating recess 302 is formed in the first engaging portion 300.

The second engaging portion 320 can be engaged with the first engaging portion 300 in a sliding direction SD1 substantially parallel to a seat surface 304 of the seat base 30 from the side of the seat base 30, such that the armrest 32 is detachably disposed on the seat base 30 by a sliding manner. In other words, the second engaging portion 320 can be disengaged from the first engaging portion 300 in the sliding direction SD1 parallel to the seat surface 304 of the seat base 30, so as to detach the armrest 32 from the seat base 30 by the sliding manner. Since the first engaging portion 300 is a recessed member and the second engaging portion 320 is a protruded member, the first engaging portion 300 and the second engaging portion 320 can provide a secure inter lock between the armrest 32 and the seat base 30.

Furthermore, the accommodating recess 302 is exposed and allows a child to put his/her personal items when the armrest 32 is detached from the seat base 30. The accommodating recess 302 is covered by the armrest 32 when the armrest 32 is attached to the seat base 30.

Figure 11:
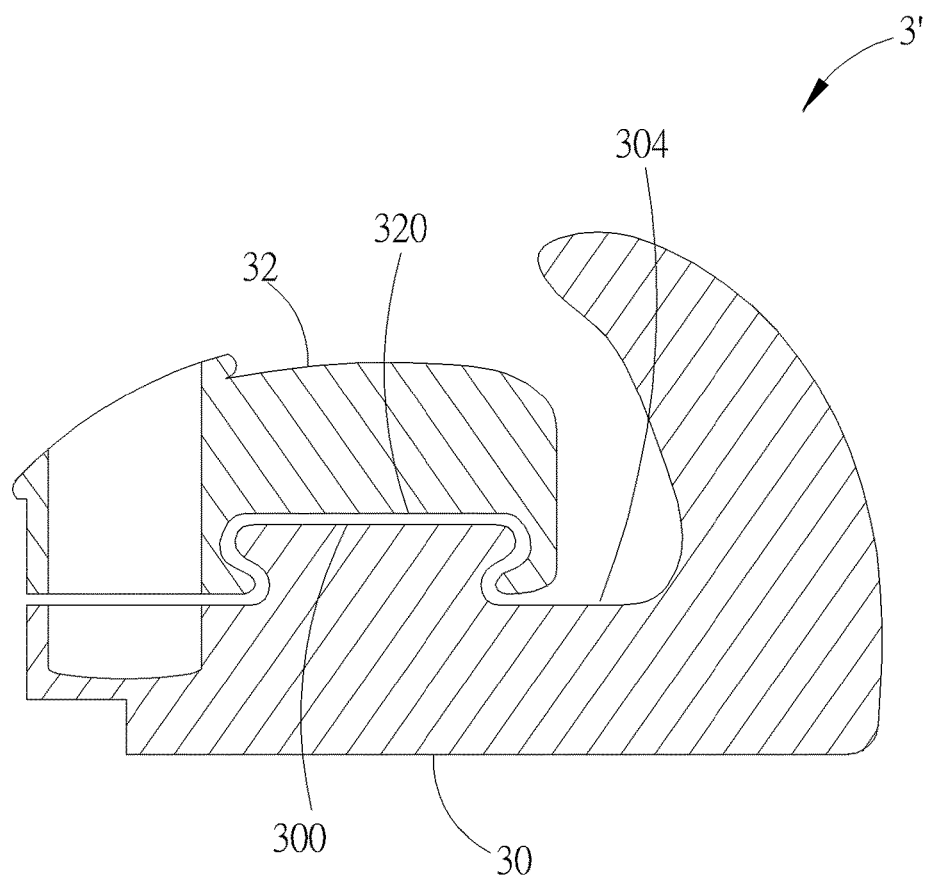
FIG. 11 is a side view illustrating a child safety seat according to another embodiment of the invention.

Referring to FIG. 11, FIG. 11 is a side view illustrating a child safety seat 3' according to another embodiment of the invention. The main difference between the child safety seat 3' and the aforesaid child safety seat 3 is that, in the child safety seat 3', the first engaging portion 300 of the seat base 30 is a protruded member and the second engaging portion 320 of the armrest 32 is a recessed member.

In this embodiment, the second engaging portion 320 can also be engaged with the first engaging portion 300 in a sliding direction substantially parallel to a seat surface 304 of the seat base 30 from the side of the seat base 30, such that the armrest 32 is detachably disposed on the seat base 30 by a sliding manner. In other words, the second engaging portion 320 can also be disengaged from the first engaging portion 300 in the sliding direction substantially parallel to the seat surface 304 of the seat base 30, so as to detach the armrest 32 from the seat base 30 by the sliding manner. Since the first engaging portion 300 is a protruded member and the second engaging portion 320 is a recessed member, the first engaging portion 300 and the second engaging portion 320 can provide a secure inter lock between the armrest 32 and the seat base 30.

Therefore, according to the embodiments shown in FIGS. 10 and 11, one of the first engaging portion 300 and the second engaging portion 320 may be a recessed member, and another one of the first engaging portion 300 and the second engaging portion 320 may be a protruded member.

Figure 12:
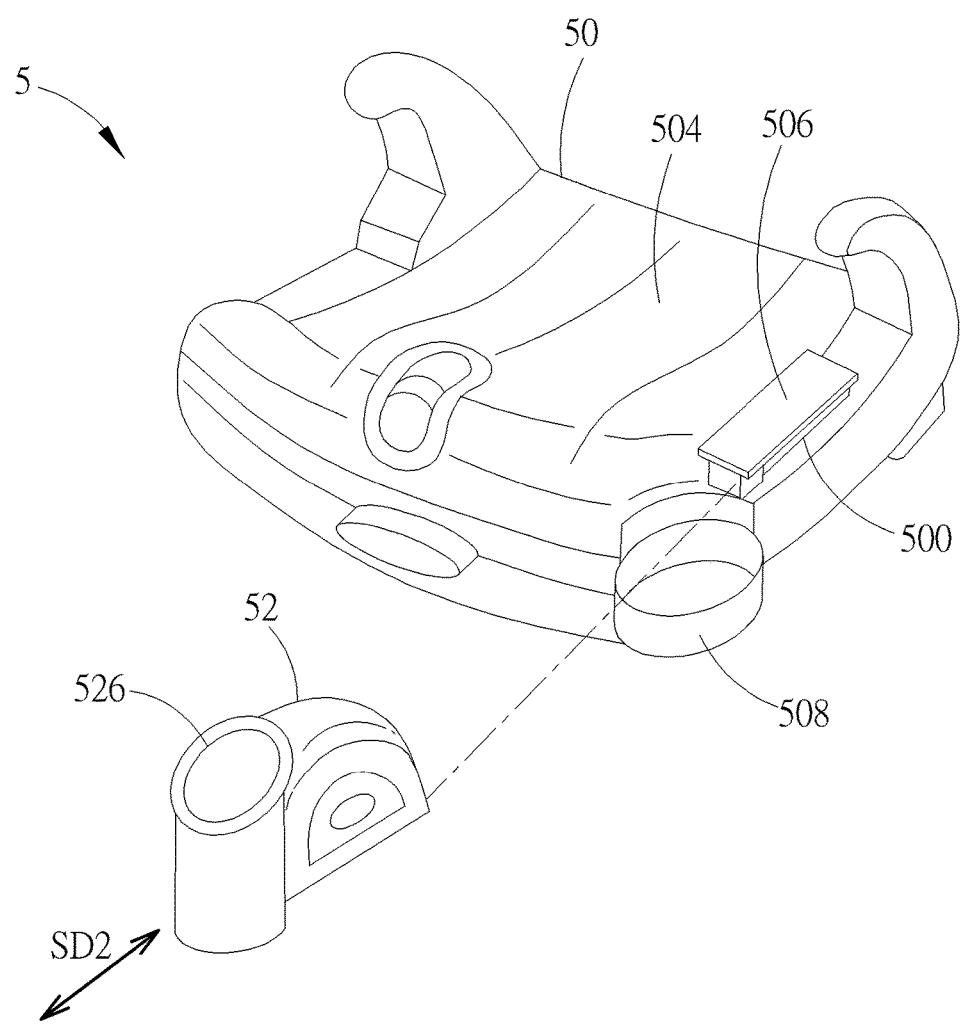
FIG. 12 is a perspective view illustrating a child safety seat according to another embodiment of the invention.
Figure 13:
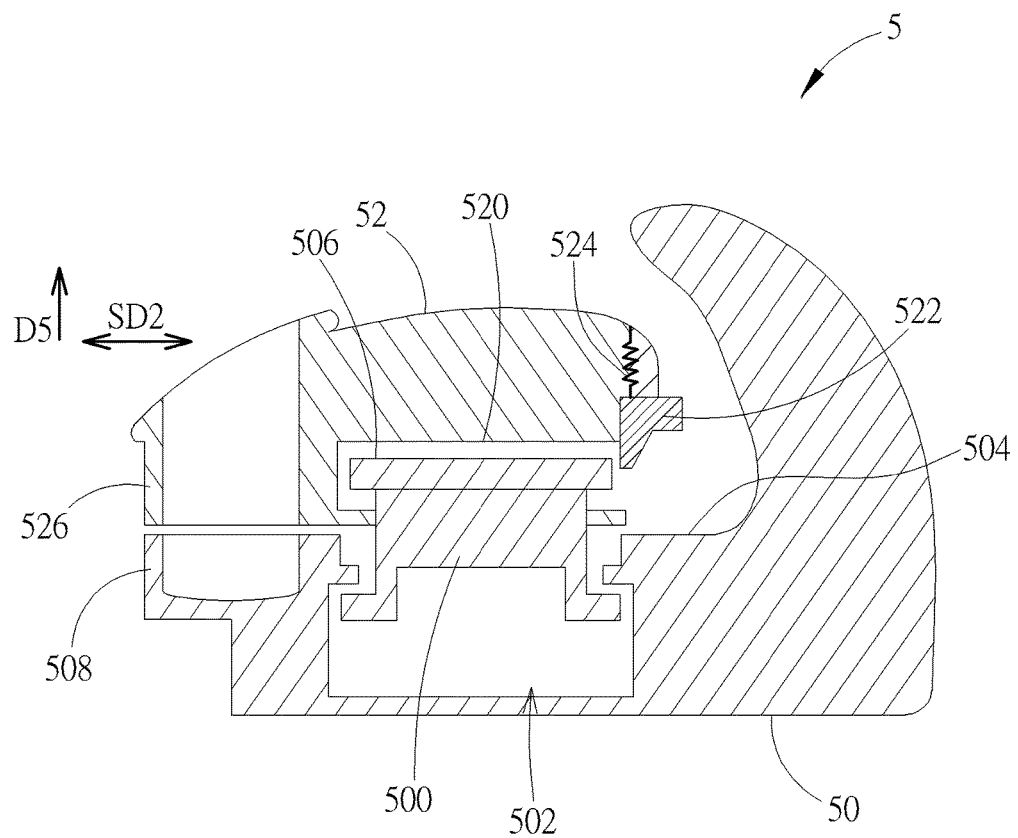
FIG. 13 is a sectional view illustrating the child safety seat shown in FIG. 12.

Referring to FIGS. 12 and 13, FIG. 12 is a perspective view illustrating a child safety seat 5 according to another embodiment of the invention and FIG. 13 is a sectional view illustrating the child safety seat 5 shown in FIG. 12. As shown in FIGS. 12 and 13, the child safety seat 5 comprises a seat base 50 and an armrest 52. The seat base 50 has a first engaging portion 500 and the armrest 52 has a second engaging portion 520. In this embodiment, the first engaging portion 500 is a protruded member, the second engaging portion 520 is a recessed member, and an accommodating recess 502 is formed in the seat base 50. The first engaging portion 500 is movably disposed in the accommodating recess 502.

In this embodiment, the armrest 52 further has a latch 522 and a resilient member 524, wherein the latch 522 is movably disposed on the armrest 52 and the resilient member 524 is connected to the latch 522. The resilient member 524 may be, but not limited to, a spring. The second engaging portion 520 can be engaged with the first engaging portion 500 in a sliding direction SD2 substantially parallel to a seat surface 504 of the seat base 50 from the front of the seat base 50 when the first engaging portion 500 protrudes from the accommodating recess 502, such that the armrest 52 is detachably disposed on the seat base 50 by a sliding manner. Furthermore, the latch 522 is engaged with the first engaging portion 500 when the armrest 52 is disposed on the seat base 50. Accordingly, the latch 522 retains the armrest 52 from being able to slide forward until the latch 522 is released.

The armrest 52 is able to be detached from the seat base 50 when the latch 522 is released. The user may release the latch 522 in the direction D5 to disengage the latch 522 from the first engaging portion 500, such that the second engaging portion 520 can be disengaged from the first engaging portion 500 in the sliding direction SD2 substantially parallel to the seat surface 504 of the seat base 50, so as to detach the armrest 52 from the seat base 50 by the sliding manner. After detaching the armrest 52 from the seat base 50, the user may press down the first engaging portion 500 to sink the first engaging portion 500 into the accommodating recess 502. Consequently, a surface 506 of the first engaging portion 500 may be substantially flush with the seat surface 504 when the first engaging portion 500 sinks into the accommodating recess 502. In this embodiment, the invention may install a push-push type latch mechanism in the accommodating recess 502, such that the first engaging portion 500 may protrude from the accommodating recess 502 or sink into the accommodating recess 502 through the push-push type latch mechanism when the first engaging portion 500 is pressed. It should be noted that the principle of the push-push type latch mechanism is well known by one skilled in the art, so the repeated explanation will not be depicted herein.

It should be noted that the resilient member 524 is compressed by the latch 522 when the latch 522 moves in the direction D5 and the compressed resilient member 524 may generate an elastic force to push the latch 522 back.

In this embodiment, the seat base 50 may have a first cup holder 508 and the armrest 52 may have a second cup holder 526. As shown in FIG. 13, the second cup holder 526 is stacked on the first cup holder 508 when the armrest 52 is disposed on the seat base 50.

As mentioned in the above, the armrest can be attached to the seat base as a child is seated on the seat base, such that the child can rest his/her hands on the armrest. Furthermore, the armrest can be detached from the seat base to reduce the size of the child safety seat. Accordingly, without the armrest, the child safety seat can be stored or transported easily, a child can climb in and out of the child safety seat easily, and a vehicle seat belt can be buckled to install the child safety seat into a vehicle easily.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A child safety seat comprising:
a seat body including a seat base;
an armrest having a first engaging portion; and
an actuating mechanism disposed on the seat base, the actuating mechanism having an actuating portion and a second engaging portion, the actuating portion being exposed from the seat base, the second engaging portion being engaged with the first engaging portion when the armrest is disposed on the seat base, the second engaging portion being disengaged from the first engaging portion when the actuating portion is actuated to move the actuating mechanism, such that the armrest is able to be detached from the seat base.

2. The child safety seat of claim 1, wherein the actuating mechanism comprises an actuating member and an engaging member, the engaging member is connected to the actuating member, the actuating member provides the actuating portion, the engaging member provides the second engaging portion, and the engaging member is actuated to rotate by the actuating member when the actuating portion is actuated to move the actuating member, such that the second engaging portion is disengaged from the first engaging portion.

3. The child safety seat of claim 2, wherein the seat base has an engaging recess and an end of the engaging member is rotatably engaged with the engaging recess.

4. The child safety seat of claim 2, wherein the actuating mechanism further comprises a resilient member connected to the engaging member and the seat base.

5. The child safety seat of claim 2, wherein the seat base has a first cup holder and the actuating member is located at a bottom of the first cup holder.

6. The child safety seat of claim 5, wherein the armrest has a second cup holder and the second cup holder is stacked on the first cup holder when the armrest is disposed on the seat base.

7. The child safety seat of claim 2, wherein the second engaging portion has a curved surface, and the armrest pushes the engaging member to rotate in a direction away from the first engaging portion through the curved surface when the armrest is attached to the seat base.

8. The child safety seat of claim 1, further comprising a cover detachably disposed on the armrest.

9. The child safety seat of claim 1, wherein one of the first engaging portion and the second engaging portion is an engaging hole, and another one of the first engaging portion and the second engaging portion is an engaging protrusion.

10. A child safety seat comprising:
a seat base having a first engaging portion, the first engaging portion being a protruded member, an accommodating recess being formed in the seat base, the first engaging portion being movably disposed in the accommodating recess; and
an armrest having a second engaging portion, the second engaging portion being a recessed member, the second engaging portion being engaged with the first engaging portion in a sliding direction substantially parallel to a seat surface of the seat base when the first engaging portion protrudes from the accommodating recess, such that the armrest is detachably disposed on the seat base by a sliding manner.

11. The child safety seat of claim 10, wherein a surface of the first engaging portion is substantially flush with the seat surface when the first engaging portion sinks into the accommodating recess.

12. The child safety seat of claim 10, wherein the armrest further has a latch movably disposed on the armrest, the latch is engaged with the first engaging portion when the armrest is disposed on the seat base, and the armrest is able to be detached from the seat base when the latch is released.

13. The child safety seat of claim 12, wherein the armrest further has a resilient member connected to the latch.

14. The child safety seat of claim 10, wherein the seat base has a first cup holder, the armrest has a second cup holder, and the second cup holder is stacked on the first cup holder when the armrest is disposed on the seat base.

* * * * *